Patented July 20, 1954

2,684,304

UNITED STATES PATENT OFFICE 2,684,304

OPTICAL GLASS

Gustav Weissenberg, Marburg (Lahn), and Norbert Meinert, Münchhausen, Kreis Marburg, Germany, assignors to Ernst Leitz G. m. b. H., Wetzlar (Lahn), Germany, a corporation of Germany No Drawing. Application June 12, 1951, Serial No. 231,262

Claims priority, application Germany July 8, 1950

11 Claims. (Cl. 106—47)

Our invention relates to optical flint glass with a small proportion of partial dispersion, the so-called $\vartheta$-value, $$\left(\vartheta = \frac{n_G - n_F}{n_F - n_C}\right)$$

The new optical glass of our invention comprises lead phosphate, $Pb_3(PO_4)_2$, and one or more phosphates of elements of the main series of the second group or the side series of the fifth group of the periodic system (except radium and nitrogen, phosphorus and arsenic respectively), for example, strontium, bismuth, or magnesium. Thus these elements form a group consisting of beryllium, magnesium, calcium, strontium, barium, antimony and bismuth. Thus with strontium, for example, either $SrH(PO_4)$ or $Sr(PO_3)_3$ can be used either severally or admixed. An addition of smaller amounts of phosphorus pentoxide has proved very advantageous for stabilizing the glass without increasing its sensitiveness toward the atmosphere. The lead phosphate content varies with these glasses between 80% and 90% by weight, the percentage of strontium phosphate, for example, between 3% and 10% by weight, and the stabilizing phosphorus pentoxide between 5% and 10% by weight. Some examples are illustrated in the following table. In it, $\Delta\nu$ is the difference in the $\nu$-value for equal $\vartheta$-values referred to in the $\nu$-$\vartheta$ equation of normal glass. As one can derive from the table, the glasses differ up to about six units in $\nu$-value $$\left(\nu = \frac{n_D - 1}{n_F - n_C}\right)$$

from the heretofore known glasses based on silicic acid. In the melts in the table, added cryolite ($Na_3AlF_6$) serves as a flux. Besides cryolite or other flux other substances can be added in small amounts, which because of the insignificance of the addition scarcely change the optical values yet which find common application for stabilization against crystallizing or for decolorizing. Such substances are by way of example all glass formers as beryllium fluoride ($BeF_2$), silicon dioxide ($SiO_2$), germanium oxide ($GeO_2$), boric acid ($B_2O_3$), arsenious acid ($As_2O_3$), antimony oxide ($Sb_2O_3$), etc. but also some typical nonglass formers such as aluminum oxide ($Al_2O_3$), magnesium oxide (MgO) etc.

| Melt No. | W33/M 196 | W8/M 242 | M 184 | M 254 | M 273 |
|---|---|---|---|---|---|
| $Pb_3(PO_4)_2$ percentage by weight | 86.2 | 84.8 | 81.0 | 86.2 | 86.2 |
| $P_2O_5$ do | 8.6 | 8.4 | 8.1 | 8.6 | 8.6 |
| $SrHPO_4$ do | 4.3 | 5.9 | | | |
| $Sr(PO_3)_2$ do | | | 8.2 | | |
| $Mg_2P_2O_7$ do | | | | 4.3 | |
| $BiPO_4$ do | | | | | 4.3 |
| $Na_3AlF_6$ do | 0.9 | 0.9 | 2.7 | 0.9 | 0.9 |
| $n_D$ | 1.749 | 1.741 | 1.717 | 1.753 | 1.747 |
| $\nu$ | 33.8 | 34.2 | 35.8 | 33.6 | 33.8 |
| $\vartheta$ | 0.578 | 0.579 | 0.577 | 0.580 | 0.579 |
| $\Delta\nu$ | 5.8 | 4.6 | 4.1 | 4.7 | 4.9 |

In carrying forward the invention mixtures of phosphate can be added successfully to the lead phosphate as, for example, acid strontium phosphate ($SrHPO_4$) and bismuth phosphate ($BiPO_4$) etc., whereby however the content of lead phosphate must remain within the limits of 80% to 90% by weight.

The above invention is not limited to the compositions set forth in the above examples. Its scope is established only through the compositions which are provided with from 80 to 90 per cent by weight of lead phosphate and one or more phosphates of the principal series of group II or the side series of group V of the periodic system or mixtures of these herein defined phosphates.

Having described our invention, what we claim is:

1. Optical flint glass consisting essentially of 80% to 90% by weight of lead phosphate, 5% to 10% by weight of phosphorus pentoxide, and 3% to 10% by weight of acid strontium phosphate.

2. Optical flint glass consisting essentially of 80% to 90% by weight of lead phosphate, 5% to 10% by weight of phosphorus pentoxide, and 3% to 10% by weight of strontium phosphate.

3. Optical flint glass consisting essentially of 80% to 90% by weight of lead phosphate, 5% to 10% by weight of boric acid anhydride and 3% to 10% by weight of magnesium pyrophosphate.

4. Optical flint glass consisting essentially of 80% to 90% by weight of lead phosphate, 5% to 10% by weight of boric acid anhydride and 3% to 10% by weight of bismuth phosphate.

5. Optical flint glass consisting essentially of 80% to 90% by weight of lead phosphate, 5% to 10% by weight of phosphorus pentoxide, and 3% to 10% by weight of at least one phosphate of at least one element of the group consisting of beryllium, magnesium, calcium, strontium, barium, antimony, and bismuth.

6. Optical flint glass of claim 5 containing a flux.

7. Optical flint glass of claim 5 containing cryolite.

8. Optical flint glass of claim 5 containing a crystallizing retarding agent.

9. Optical glass of claim 8 in which said crystallizing retarding agent is boric acid anhydride.

10. Optical flint glass of claim 8 in which said crystallizing retarding agent is aluminum oxide.

11. Optical flint glass of claim 5 containing arsenious acid as a decolorizing agent.

References Cited in the file of this patent

UNITED STATES PATENTS

| Number | Name | Date |
|---|---|---|
| 1,654,404 | Blumenberg | Dec. 27, 1927 |
| 2,518,194 | Silverman et al. | Aug. 8, 1950 |

FOREIGN PATENTS

| Number | Country | Date |
|---|---|---|
| 585,257 | Great Britain | 1947 |

OTHER REFERENCES

Sprechsaal, August 15, 1918, pages 149–150.